(12) United States Patent
Abadi et al.

(10) Patent No.: US 10,956,279 B2
(45) Date of Patent: Mar. 23, 2021

(54) MANAGING BIG DATA ON DOCUMENT BASED NOSQL DATABASES

(71) Applicant: INTERNATIONAL BUSINESS MACHINES CORPORATION, Armonk, NY (US)

(72) Inventors: Aharon Abadi, Petach Tikva (IL); Roie Melamed, Haifa (IL); Hisham Yasin, Haifa (IL); Ashraf Haib, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 410 days.

(21) Appl. No.: 15/830,163

(22) Filed: Dec. 4, 2017

(65) Prior Publication Data
US 2019/0171532 A1 Jun. 6, 2019

(51) Int. Cl.
*G06F 11/14* (2006.01)
*H04L 29/08* (2006.01)
*G06F 16/23* (2019.01)

(52) U.S. Cl.
CPC ...... *G06F 11/1464* (2013.01); *G06F 11/1469* (2013.01); *G06F 16/2358* (2019.01);
(Continued)

(58) Field of Classification Search
CPC ............. G06F 11/1464; G06F 16/2358; G06F 11/1469; G06F 2201/84; G06F 11/1451;
(Continued)

(56) References Cited

U.S. PATENT DOCUMENTS 9,639,592 B1 5/2017 Natanzon et al.
10,496,498 B1 12/2019 Choudhuri et al.
(Continued)

OTHER PUBLICATIONS

Grace Period Disclosure: Abadi et al., "Holistic Disaster Recovery Approach for Big Data NoSQL Workloads", Pubished in: Big Data (Big Data), 2016 IEEE International Conference, Date of Conference: Dec. 5-8, 2016, http://ieeexplore.ieee.org/document/7840833/, printed Nov. 28, 2017, pp. 1-8.
(Continued)

*Primary Examiner* — Michael Pham
(74) *Attorney, Agent, or Firm* — L. Jeffrey Kelly

(57) ABSTRACT

A document management system including a document manager connected to a document storage, and a backup coordinator connected to the document manager and adapted to: continuously receive a plurality of notifications from the document manager, each including information describing a change in a document stored in the document manager's document storage; and for each notification in the plurality of notifications: select a backup agent from a plurality of backup agents connected to the backup coordinator; send a backup request to the backup agent including the information, for the purpose of updating a copy of the document stored in a backup storage connected to the backup agent; wait for an acknowledgement message from the backup agent; and send another backup request to another backup agent selected from the plurality of backup agents upon a failure to receive the acknowledgement message within an identified amount of time after sending the backup request.

19 Claims, 8 Drawing Sheets

(52) U.S. Cl.
CPC ...... *H04L 67/1034* (2013.01); *H04L 67/1095* (2013.01); *G06F 2201/84* (2013.01); *H04L 67/02* (2013.01)

(58) Field of Classification Search
CPC .............. G06F 11/202; G06F 11/1443; G06F 2201/80; G06F 11/1456; H04L 67/1095; H04L 67/1034; H04L 67/02
USPC ........................................................ 707/654
See application file for complete search history.

(56) References Cited

U.S. PATENT DOCUMENTS

| | | |
|---|---|---|
| 2014/0040206 A1 | 2/2014 | Ramakrishnan et al. |
| 2015/0127982 A1 | 5/2015 | Tung et al. |
| 2016/0182633 A1* | 6/2016 | Grebnov ................. G06F 16/27 709/219 |
| 2016/0275089 A1 | 9/2016 | Soundararajan et al. |
| 2017/0091047 A1 | 3/2017 | Bangalore et al. |
| 2017/0192866 A1* | 7/2017 | Vijayan ................... G06F 3/067 |
| 2020/0186602 A1 | 6/2020 | Leshinsky et al. |

OTHER PUBLICATIONS

Grace Period Disclosure: Abadi et al., "Holistic Disaster Recovery Approach for Big Data NoSQL Workloads",2016 IEEE International Conference on Big Data (Big Data), pp. 1-6.

\* cited by examiner

MANAGING BIG DATA ON DOCUMENT BASED NOSQL DATABASES

STATEMENT REGARDING PRIOR DISCLOSURES BY THE INVENTOR OR A JOINT INVENTOR

The following disclosure(s) are being submitted under 35 U.S.C. § 102(b)(1)(A) as prior disclosures by, or on behalf of, a sole inventor of the present application, or a joint inventor of the present application: Holistic Disaster Recovery Approach for Big Data NoSQL Workloads, IBM, Dec. 6, 2016.

BACKGROUND

The present invention, in some embodiments thereof, relates to a system and method for managing documents and, more specifically, but not exclusively, to a system and method for managing big data on document based Not Only Structured Query Language (NoSQL) databases.

The term NoSQL databases relates to a variety of approaches to storage and retrieval of data that is modeled in means other than tabular relations used in traditional relational databases. Some formats used to model data in these approaches include documents, key-value pairs, columnar formats and graph formats. NoSQL databases are increasingly used when working with large sets of distributed data, for example in big-data and real-time web applications, where data sets are so large or complex that traditional storage and data processing application software is inadequate to deal with them.

Data resiliency is an ability to recover data after a failure. Data resiliency has become important to an increasing amount of businesses and organizations. Data loss due to cyber-attacks, human errors, hardware and software failures and natural disaster may lead to significant financial costs to a business and might hurt an organization's reputation. Two measures of data resiliency are a maximum allowable amount of time, known as Recovery Time Object (RTO), required to recover data after a failure such that a business regains availability and functionality, and a maximal amount of time, known as Recovery Point Objective (RPO), for which data may be lost following a failure and recovery. Data resiliency solutions aim to minimize both RTO and RPO.

SUMMARY

It is an object of the present invention to provide a system and a method for managing documents and, more specifically, but not exclusively, to provide a system and a method for managing big data on document based Not Only Structured Query Language (NoSQL) databases.

The foregoing and other objects are achieved by the features of the independent claims. Further implementation forms are apparent from the dependent claims, the description and the figures.

Aspects of the present disclosure relate to a document management system includes at least one local document manager, including at least one hardware processor connected to a local document storage, and at least one backup coordinator including at least one other hardware processor connected to the at least one local document manager. The at least one backup coordinator is adapted to: continuously receive a plurality of change notifications from the at least one local document manager, each including change information describing a change in a document stored in the at least one local document manager's local document storage; and for each notification in the plurality of change notifications: select a backup agent from a plurality of backup agents connected to the at least one backup coordinator, where the backup agent includes at least one third hardware processor; send a backup request to the backup agent including the change information, for the purpose of updating a copy of the document stored in a backup storage connected to the backup agent; wait for an acknowledgement message from the backup agent; and send another backup request to another backup agent selected from the plurality of backup agents upon a failure to receive the acknowledgement message within an identified amount of time after sending the backup request.

Aspects of the present disclosure relate to a method for managing documents, includes: continuously receiving a plurality of change notifications from at least one local document manager, each including change information describing a change in a document stored in the at least one local document manager's local document storage; and for each notification in the plurality of change notifications: selecting a backup agent from a plurality of backup agents; sending a backup request to the backup agent including the change information, for the purpose of updating a copy of the document stored in a backup storage connected to the backup agent; waiting for an acknowledgement message from the backup agent; and sending another backup request to another backup agent selected from the plurality of backup agents upon a failure to receive the acknowledgement message within an identified amount of time after sending the backup request.

According to an aspect of the present disclosure the at least one backup coordinator is further adapted to: receive from at least one of the at least one local document manager a first request to restore the document; send a second request to at least one of the plurality of backup agents to restore the document; receive from at least one of the plurality of backup agents a message including the document; and send the document to the at least one of the at least one local document manager. Documents may be restored on demand.

According to an aspect of the present disclosure the at least one backup coordinator is further adapted to: receive, from a local document manager of the at least one local document manager or from a user via a management interface, a document backup request including information identifying one or more local documents stored in the local document manager's local document storage; retrieve the one or more local documents from the local document manager's local document storage; and for each local document of the one or more local documents: select an on-demand backup agent from the plurality of backup agents; send the on-demand backup agent an on-demand backup request including the local document, for the purpose of updating a copy of the local document stored in the backup storage connected to the on-demand backup agent; wait for an on-demand acknowledgement message from the on-demand backup agent; and send another on-demand backup request to another on-demand backup agent selected from the plurality of backup agents upon a failure to receive the on-demand acknowledgement message within the identified amount of time after sending the on-demand backup request. Providing a mechanism to ensure backup of identified documents on-demand further reduces risk of losing critical data.

According to an aspect of the present disclosure the at least one backup coordinator is connected to the at least one local document manager via a first digital communication network. In an embodiment, the at least one backup coordinator is connected to the plurality of backup agents via a second digital communication network. Connecting the backup coordinator to the at least one local document manager and the plurality of backup agents via one or more digital communication networks facilitates using a single backup coordinator to coordinate backup of a plurality of documents from a plurality of local document managers residing in separate locations.

According to an aspect of the present disclosure the at least one backup coordinator is further adapted to execute at least one Representational State Transfer (REST) interface. The at least one backup coordinator receives the plurality of change request messages via the at least one REST interface. Using a REST interface helps reduce costs of the plurality of backup agents as implementing a REST client does not demand extensive processing resources.

According to an aspect of the present disclosure the at least one backup coordinator is further adapted to: receive from the backup agent a failure message indicating a failure to update the copy of the document stored in the backup storage connected to the backup agent; and send the other backup request to the other backup agent upon receiving the failure message. By receiving a failure message and initiating the other backup request upon receiving the message failure without waiting for a timeout, the at least one backup coordinator is able to increase the speed at which the document is updated in a backup storage.

According to an aspect of the present disclosure the change information includes a document version number. In an embodiment, the first request and the second request includes a document version number. Using a document version number allows storing multiple versions of a single document, and retrieving a certain version of the single document.

According to an aspect of the present disclosure the system further includes at least one monitor hardware processor connected to the at least one backup coordinator and the at least one backup agent, and adapted to: detect a failure of the backup agent to update the copy of the document stored in the backup storage connected to the backup agent; and send a monitoring message to the backup coordinator indicating the failure. The at least one backup coordinator is further adapted to: receive the monitoring message; and send the other backup request to the other backup agent, upon receiving the monitoring message. In an embodiment, the at least one monitoring hardware processor executes Apache ZooKeeper. Using a monitor increases reliability of the system by providing another means of providing the at least one backup coordinator with information allowing the at least one backup coordinator to initiate the other backup request in case the second backup request is needed.

According to an aspect of the present disclosure the at least one backup coordinator maps each of the at least one local document manager to one of the at least one backup agent. The backup coordinator selects the backup agent according to the mapping. Using one backup coordinator for requests arriving from one backup agent allows using caching methods on the one backup agent and thus may improve speed of backup and restore.

According to an aspect of the present disclosure the at least one backup coordinator includes a primary backup coordinator. Using a primary backup coordinator may prevent duplicate processing by a plurality of backup coordinators, thus preventing wasteful use of computing and networking resources.

According to an aspect of the present disclosure the backup storage connected to the backup agent is a Hadoop File System (HDFS).

According to an aspect of the present disclosure the local document storage is a document-based Not Only Structured Query Language (NoSQL) database. In an embodiment, the local document storage is an International Business Machines (IBM) Cloudant database.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced. In the drawings.

DETAILED DESCRIPTION

Figure 1:
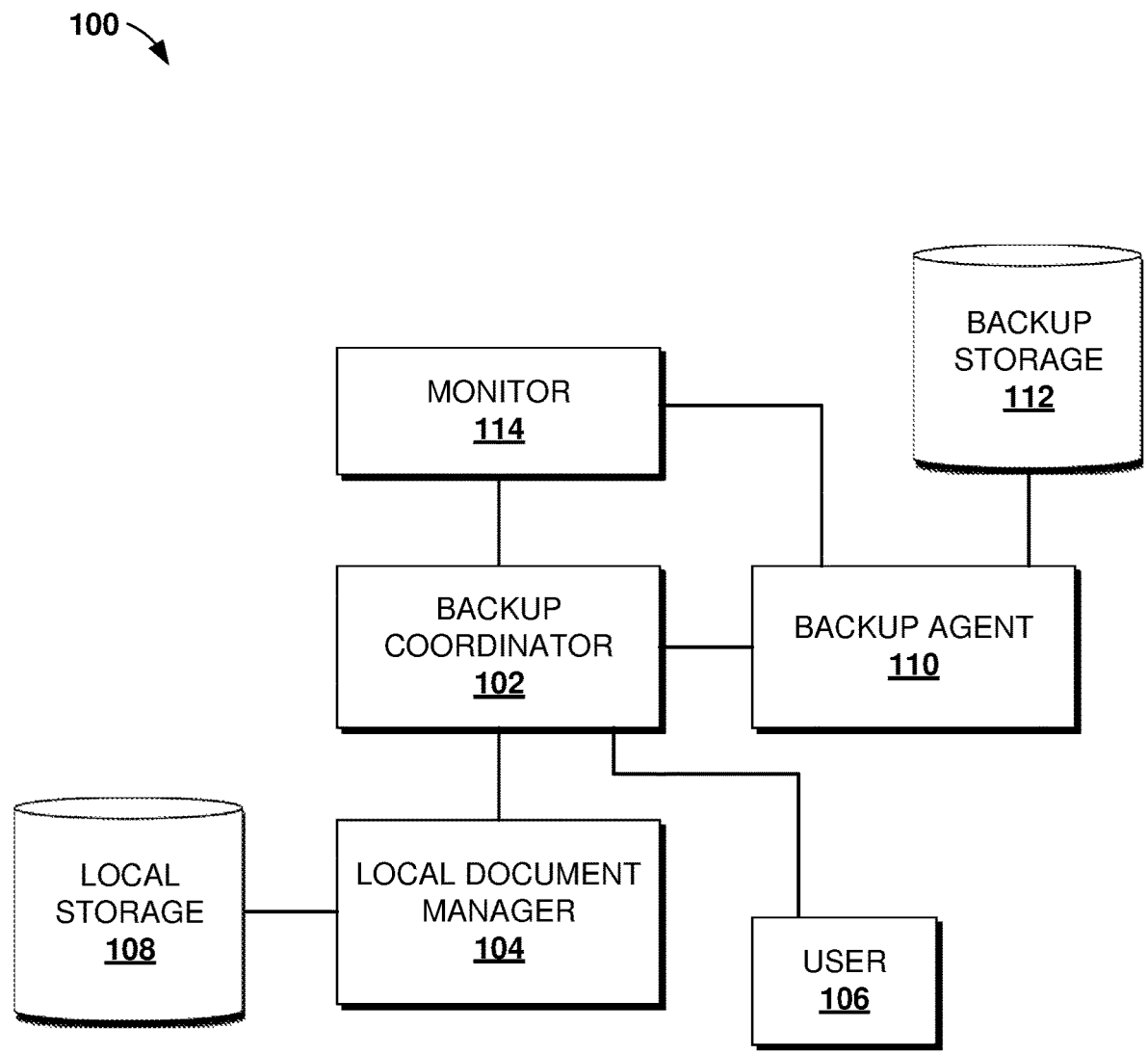
FIG. 1 is a schematic block diagram of an exemplary system, according to some embodiments of the present invention.

In recent years, NoSQL databases have emerged as an answer to Internet scale datasets; however, these solutions do not support out of the box the necessary backup, restore and disaster recovery capabilities required by many big data scenarios. A novel disaster recovery approach designed for big data NoSQL workloads is proposed by the present disclosure. The proposed disaster recovery approach can support low recovery point and time objectives at low costs. The disclosed approach is highly scalable and elastic, based on open source components and suitable for any document-based NoSQL solution, which makes it highly attractive for diverse big data workloads.

Data resiliency has become very important in recent years for virtually all enterprises: data loss due to cyber-attacks, human errors, hardware/software failures or a natural disaster can lead to significant financial costs, and can substantially hurt the business reputation. An adequate data resiliency solution is able to quickly recover data after failures within a constant period of time so that the business can regain availability. The present disclosure is directed at data resiliency of document based NoSQL databases, for example, International Business Machines (IBM) Cloudant, Apache Jackrabbit and MongoDB, which are designed to handle unstructured big data. An estimated 80% of organizations data is unstructured. For a given Total Cost of Ownership, NoSQL databases with their relaxed consistency model and simple semantics can support higher loads compared to their relational counterparts.

Two possible data resiliency strategies applied by some existing NoSQL database solutions are data replication and periodic snapshot-based backup.

Data replication of a database may be achieved by creating and storing a plurality of copies of each data element of the database, for example each document, on a plurality of storage nodes or a plurality of data centers of the database. A storage node, also known as a node, is typically a physical server with one or more hard-disk drives (HDDs) or solid-state drives (SDDs). In addition, a node may be a virtual machine with access to one or more HDDs and/or SSDs. A data center is a facility composed of networked computers and storage that businesses or other organizations use to organize, process, store, and disseminate large amounts of data. A database may be organized in multiple data centers, for increased performance and resiliency. Failure of a single node or even an entire data center may be overcome by reverting to an alternative node or data center, having replicated data. Data replication may be performed at high frequency, for example upon each database change, as there is a need to replicate only changed data elements which are typically few compared to the entire database. However some failures, for example some human errors and some cyber-attacks, may result in some corrupted replicated data elements and recovery from such failures may require retrieval of an earlier copy of the corrupted data elements.

In a snapshot-based backup, an entire database is replicated to an external data storage solution external to the database. After a failure, data may be recovered from a previous snapshot stored on the external data storage solution. A snapshot-based backup, whether including entire documents or a plurality of differences from a previous snapshot, may require an amount of processing resources, storage capacity and network bandwidth making it feasible to perform in some solutions at a lower frequency than data replication, for example only every several hours or once a day. As a result, changes to elements of the database occurring after a last snapshot backup cannot be recovered from a snapshot. In such solutions, the RPO has a lower limit of the frequency of snapshot backups.

To address the shortcomings of data replication and periodic snapshot-based techniques, the present disclosure proposes a holistic backup/restore approach for document-based NoSQL solutions that can achieve low RPO at all times. This approach is based on a novel trigger-based backup that leverages two mechanisms of document-based NoSQL solutions: i) an increasing version number attached to each changed/new document; and ii) a changes/updates feed/channel allowing to receive a notification about each database change (i.e., a new/changed document). Combined with synchronous local replication and asynchronous remote replication, each new/changed document is immediately (though asynchronously) replicated to a stable storage with the document version number. For each document, we store the last X versions of the document, where X is a configuration parameter. Such a backup approach has two inherent advantages over periodic-based backup approaches: i) it is applied at the highest possible frequency (every database change) rather than at a fixed frequency, and hence can support lower RPO/RTO; and ii) being a document-based backup approach (the lowest possible granularity), it is more efficient than any periodic database-based backup, regardless of whether this backup is based on a complete or an incremental backup.

Another advantage of the proposed backup/restore approach lies within the backup and restore tier that supports bidirectional replication: replication of data from the database into the stable storage, i.e., backup, and replication at the opposite direction, i.e., restore. This tier is implemented by a dynamic set of worker nodes that can seamlessly grow or shrink to support fluctuations in workload, thus keeping TCO to a bare minimum. To summarize, the proposed approach includes the following unique features: (a) trigger-based backup approach: low granularity backup approach can achieve lower RPO/RTO compared to periodic-based backup approaches; (b) high parallelism: a dynamic set of worker nodes can support high data injection throughputs without increasing the RPO. Similarly, the high parallelism also minimizes the RTO; and (c) high modularity: the proposed approach can leverage any stable storage that supports direct or indexed access, e.g., Hadoop File System (HDFS). This is in contrast to exiting NoSQL solutions that are based on either a proprietary storage solution or supporting only a few designated storage options.

The present invention, in some embodiments thereof, relates to a system and method for managing documents and, more specifically, but not exclusively, to a system and method for managing big data on document-based NoSQL databases. A system and method are disclosed for managing documents in a document-based NoSQL database by continuously backing up database changes to a stable backup storage such that RPO is significantly lower than when using snapshot-based backup techniques.

In some embodiments of the present invention, at least one backup coordinator continuously receives change notifications from one or more local document managers and initiates for each of the change notifications a backup of a document by sending change information contained in the change notification to one of a plurality of backup agents (for example worker nodes), each connected to a backup storage. In an embodiment, the at least one backup coordinator waits for an acknowledgement message from the one backup agent to confirm success of backing up the document. Upon failure to receive the acknowledgement, the at least one backup coordinator may send the change information to another one of the plurality of backup agents. The at least one backup coordinator may continue sending the change information to additional backup agents of the plurality of backup agents until receiving an acknowledgement message.

Backing up a changed document upon notification of the change and not waiting for a periodic snapshot backup facilitates reducing the length of a time window for which there is no backup of changes to the database, reducing the database's RPO. A reduced RPO increases the database's reliability and helps reduce operation costs for a business or organization following a database failure. Validating the success of the backup further increases the database's reliability. Distributing over time the processing resources and network bandwidth required to backup all changes allows reducing costs of a backup solution, as less powerful processors and lower speed network channels may be used.

In some embodiments of the present invention, using a plurality of backup agents allows further reduction of RPO by parallel processing of a plurality of change notifications, thus reducing latency of a document's backup to the backup storage compared to using a single backup agent. Thus, such embodiments of the present invention facilitate high data resiliency data solutions.

In addition, in some embodiments of the present invention one or more documents may be backed up on demand by sending an on-demand backup request to the backup coordinator, thus further increasing database reliability by enabling document backup at any time.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1, showing a schematic block diagram of an exemplary system 100, according to some embodiments of the present invention. In such embodiments, one or more backup coordinators 102 are connected to one or more local document managers 104. A local document manager optionally includes one or more hardware processors. A backup coordinator optionally includes one or more other hardware processors. In an embodiment, the one or more backup coordinators 102 are connected to the one or more local document managers 104 via a first digital communication network. In an embodiment, the connection between the one or more backup coordinators 102 and the one or more local document managers 104 utilizes an Internet Protocol (IP) connection over a network such as a Local Area Network (LAN), a Wide Area Network (WAN) or a Global System for Mobile Communication (GSM). In an embodiment, the one or more backup coordinators 102 execute one or more Representational State Transfer (REST) interfaces and the connection between the one or more local document managers and the one or more backup coordinators utilizes the one or more REST interfaces. In some embodiments, a user 106 may send one or more messages to the one or more backup coordinators using the REST interface. In an embodiment, each of the one or more local document managers 104 is connected to a local document storage 108. The local document storage 108 is optionally an HDD or an SDD. In an embodiment, the local document storage 108 is a document based NoSQL database. Examples of a document based NoSQL database are International Business Machines (IBM) Cloudant, Apache Jackrabbit and MongoDB.

It will be noted that in the context of the present invention, the term "local" with reference to the one or more local document managers and one or more local document storage does not refer to proximity in location; rather the term is used to differentiate between system components pertaining to the database being backed up and storage components external to the database used for the database backup.

In an embodiment, one or more backup coordinators are connected to one or more backup agents 110. A backup agent optionally includes at least one third hardware processor, optionally connected to a backup storage 112. In an embodiment, the backup storage 112 is a stable storage that supports direct or indexed access, for example Hadoop File System (HDFS). In an embodiment, the one or more backup coordinators 102 are connected to the one or more backup agents 110 via a second digital communication network. In an embodiment, the connection between the one or more backup coordinators 102 and the one or more backup agents 110 utilizes an Internet Protocol (IP) connection over a network such as a Local Area Network (LAN), a Wide Area Network (WAN) or a Global System for Mobile Communication (GSM).

In some embodiments of the present invention, at least one monitor hardware processor 114 is connected to the one or more backup coordinators 102 and the one or more backup agents 110 for the purpose of monitoring activity on the one or more backup agents 110 and reporting status to the one or more backup coordinators 102. In an embodiment, the at least one monitoring hardware processor executes Apache ZooKeeper.

As described below with reference to FIG. 8, the one or more backup coordinators 102, the one or more local document managers 104, the backup agent 110, and the monitor hardware processor 114 may each include internal and external components.

To continuously backup document, in some embodiments of the present invention system 100 implements the following optional method.

Figure 2:
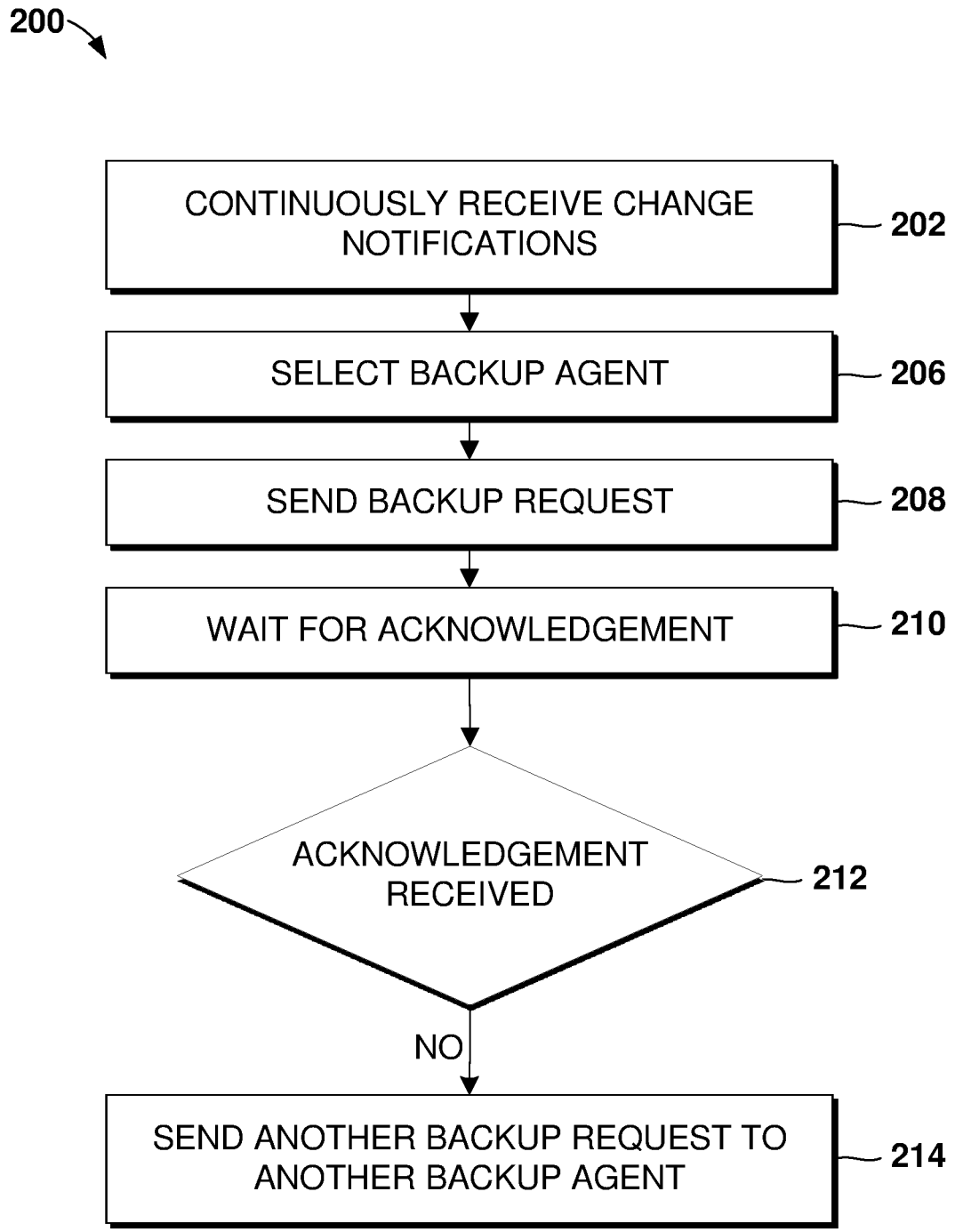
FIG. 2 is a flowchart schematically representing an optional flow of operations for continuous backup, according to some embodiments of the present invention.

Reference is now made also to FIG. 2, showing a flowchart schematically representing an optional flow of operations 200 for continuous backup, according to some embodiments of the present invention. In such embodiments, the one or more backup coordinators 102 continuously receive a plurality of change notifications from the one or more local document managers 104, at 202. Each of the change notifications optionally includes change information describing a change in a document stored in one or more local document manager's local document storage 108. The change information may include an instruction to create the document, an instruction to delete the document or an instruction to modify contents of the document. In an embodiment, at least some of the change information is formatted as a JavaScript Object Notation (JSON) object. The change information may include a document version number. In an embodiment, the one or more backup coordinators 102 include a primary backup coordinator. In an embodiment, the primary backup coordinator is selected by the one or more backup coordinators using a leader selection method, for example an Apache ZooKeeper leader election recipe. In an embodiment, the primary backup coordinator receives all change notifications from the local document managers. When a primary backup coordinator becomes inactive, the one or more backup coordinators may select another primary backup coordinator.

In an embodiment, the one or more backup coordinators 102 select a backup agent from the one or more backup agents 110 for each of the received change notifications, at 206. In an embodiment, the one or more backup coordinators map each one of the one or more local document managers 104 to the one of one or more backup agents 110, for example using a hash function. In embodiments having such a mapping, the one or more backup coordinators 102 preferably select the backup agent mapped to the certain local document manager for a change notification received from a certain local document manager, at 206. In an embodiment, if the backup agent mapped to the one or more local document managers 104 is inactive, the one or more backup coordinators 102 may select a different backup agent, at 206. In an embodiment, not all of the one or more backup agents 110 are active at all times. In an embodiment, the one or more backup coordinators select an inactive backup agent and instruct activation of the inactive backup agent, at 206.

In an embodiment, after selecting a backup agent, the one or more backup coordinators 102 sends a backup request, for example a "trigger," to the selected backup agent, for the purpose of the backup agent updating a copy of the document stored in the backup storage 112, at 208. After updating, a backup copy of the document, stored in the backup storage 112, will match the local copy of the document stored in the local storage 108. The backup request includes the change information received in the change notification.

In an embodiment, at least some of the change information in the backup request is formatted as a JSON object. When the change information includes a certain document version number, the backup agent may update the copy of the document such that the updated copy of the document may be identified by the certain version number.

In an embodiment, the one or more backup coordinators 102 wait for an acknowledgment message from the selected backup agent indicating a successful completion of the backup request, at 210. Upon determining, at 212, the acknowledgement message was not received within a predetermined amount of time after sending the backup request (at 208), the one or more backup coordinators 102 selects another backup agent of the one or more backup agents 110 and sends another backup request to the other selected backup agent, at 214. In an embodiment, the one or more backup coordinators 102 may repeat 206, 208 and 210 until an acknowledgement is received.

In embodiments where the system includes at least one monitoring hardware processor 114, the at least one monitoring hardware processor monitors the one or more backup agents to detect failures to update a document following receipt of a backup request from the one or more backup coordinators. In an embodiment, upon detecting such a failure, the at least one monitoring hardware processor sends a monitoring message to the backup coordinator indicating the failure. In such cases, upon receiving the monitoring message, the one or more backup coordinators 110 re-execute 206, 208 and 210, selecting the other backup agent and sending another backup request to the other backup agent.

In an embodiment, when the selected backup agent fails to update the copy of the document according to the backup request, the selected backup agent sends the one or more backup coordinators a failure message indicating the failure to update the copy of the document stored in the backup storage 112. In an embodiment, upon receiving the failure message, one or more backup coordinators 101 re-execute 206, 208 and 210, selecting the other backup agent and send the other backup agent the other backup request.

To restore a document from backup, in some embodiments of the present invention system 100 implements the following optional method.

Figure 3:
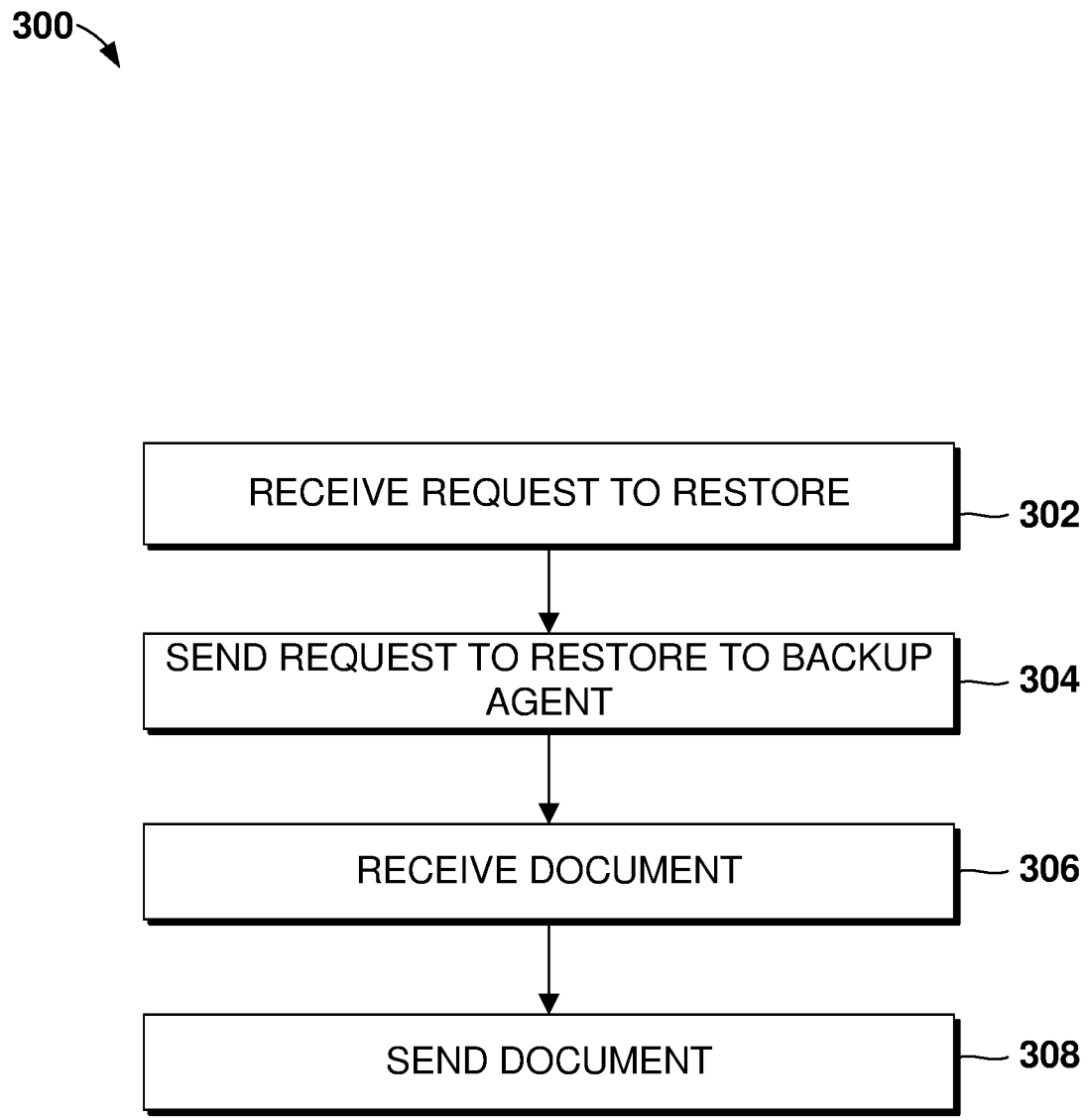
FIG. 3 is a flowchart schematically representing an optional flow of operations for restoring a document, according to some embodiments of the present invention.

Reference is now made to FIG. 3, showing a flowchart schematically representing an optional flow of operations 300 for restoring a document, according to some embodiments of the present invention. In such embodiments, the one or more backup coordinators 102 receive from at least one of the one or more local document managers a first request to restore the document previously backed up, at 302. The one or more backup coordinators optionally send a second request to restore the document to at least one of the one or more backup agents, at 304. The one or more backup coordinators optionally receive from the at least one backup agent a message including the document, at 306, and optionally send the document to the at least one local document manager requesting to restore the document, at 308. In an embodiment, the first request and the second request include a document version number. When the first and second requests include a certain document version number, the at least one backup agent optionally sends the one or more backup coordinator a version of the document identified by the certain document version number. In an embodiment, at least part of the first request and at least part of the second request are formatted as JSON objects.

Some embodiments of the present invention support on-demand backup. To provide on demand backup, system 100 implements in some embodiments the following optional method.

Figure 4:
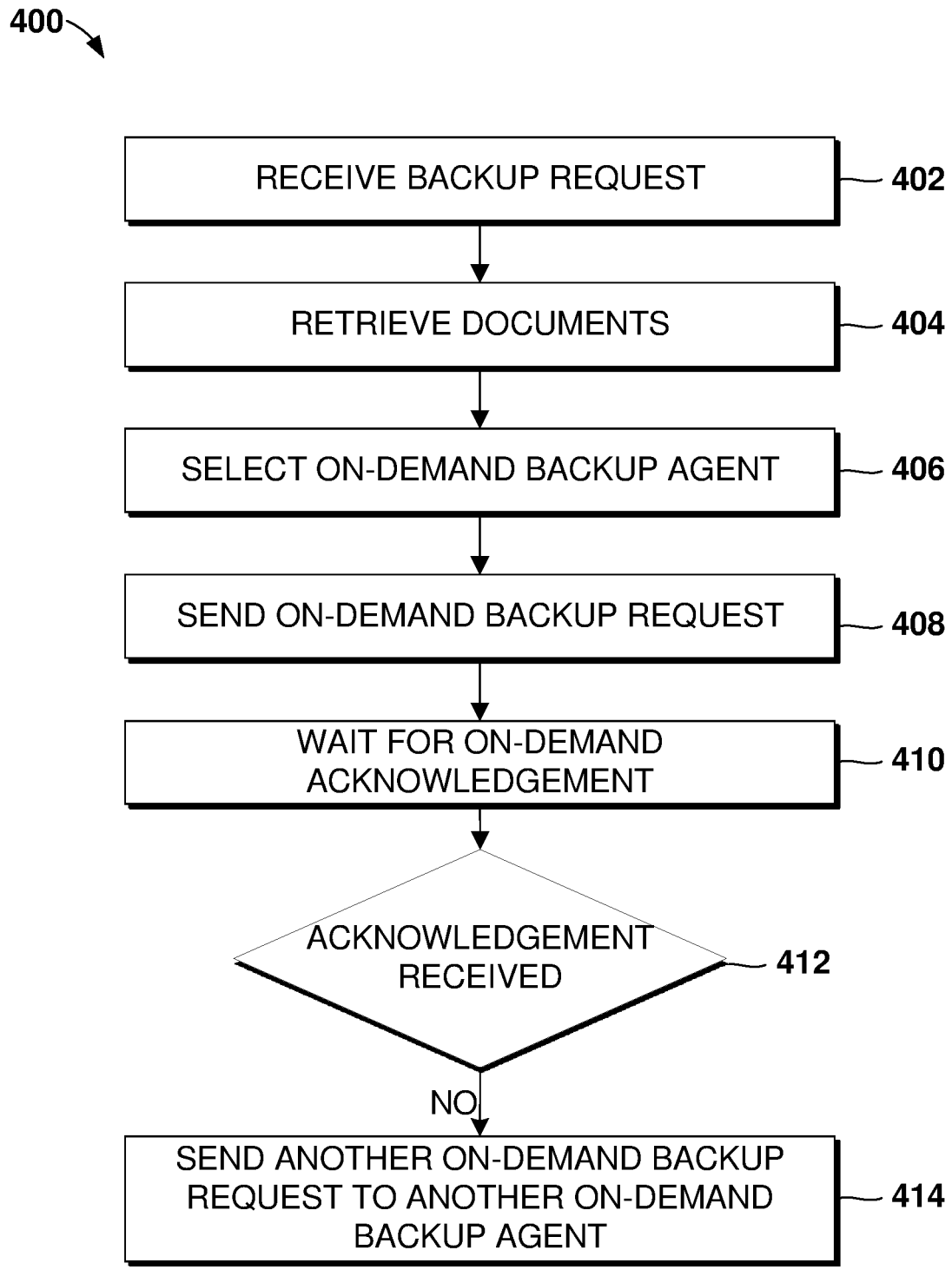
FIG. 4 is a flowchart schematically representing an optional flow of operations for on-demand backup, according to some embodiments of the present invention.

Reference is now made also to FIG. 4, showing a flowchart schematically representing an optional flow of operations 400 for on-demand backup, according to some embodiments of the present invention. In contrast to the continuous backup described with reference to FIG. 2 above, instead of continuously updating an initial snapshot of the database as documents in the databased are being changed, on-demand refers to backing up one or more documents, or in some cases the entire databased, on-demand in response to a specific request, typically received from the user 106.

In such embodiments, the one or more backup coordinators 102 receive a document backup request including information identifying one or more local documents stored in the local document manager's local document storage 108, at 402. In an embodiment, at least some of the information identifying the one or more local documents is formatted as a JSON object. The document backup request may be received from at least one local document manager of the one or more local document managers 104. Optionally the document backup request is received from the user 106. In embodiments where the one or more backup coordinators 102 implement at least one REST interface, the user 106 may use a known in the art REST client to send the document backup request to the one or more backup coordinators 102. In an embodiment, the one or more backup coordinators retrieve the one or more local documents from the local document storage 108, by communicating with the one or more local document managers 104, at 404.

In an embodiment, the one or more backup coordinators 102 select an on-demand backup agent of the one or more backup agents 110, for each local document of the one or more local documents, at 406. In an embodiment, after selecting an on-demand backup agent, the one or more backup coordinators 102 send an on-demand backup request to the selected on-demand backup agent, for the purpose of the on-demand backup agent updating a copy of each document stored in the backup storage 112, at 408. After updating, a backup copy of the document, stored in the backup storage 112, will match the local copy of the document stored in the local storage 108. In an embodiment, the one or more backup coordinators 102 wait for an on-demand acknowledgement message from the on-demand backup agent indicating a successful completion of the backup request, at 410. Upon detecting, at 412, the on-demand acknowledgement message was not received within the identified amount of time after sending the on-demand backup request (at 408), the one or more backup coordinators 102 selects another on-demand backup agent from the one or more backup agents 110 and sends another on-demand backup request to the other on-demand backup agent, at 414. In an embodiment, the one or more backup coordinators 102 may repeat 406 and 408 until an on-demand acknowledgement message is received.

Figure 5:
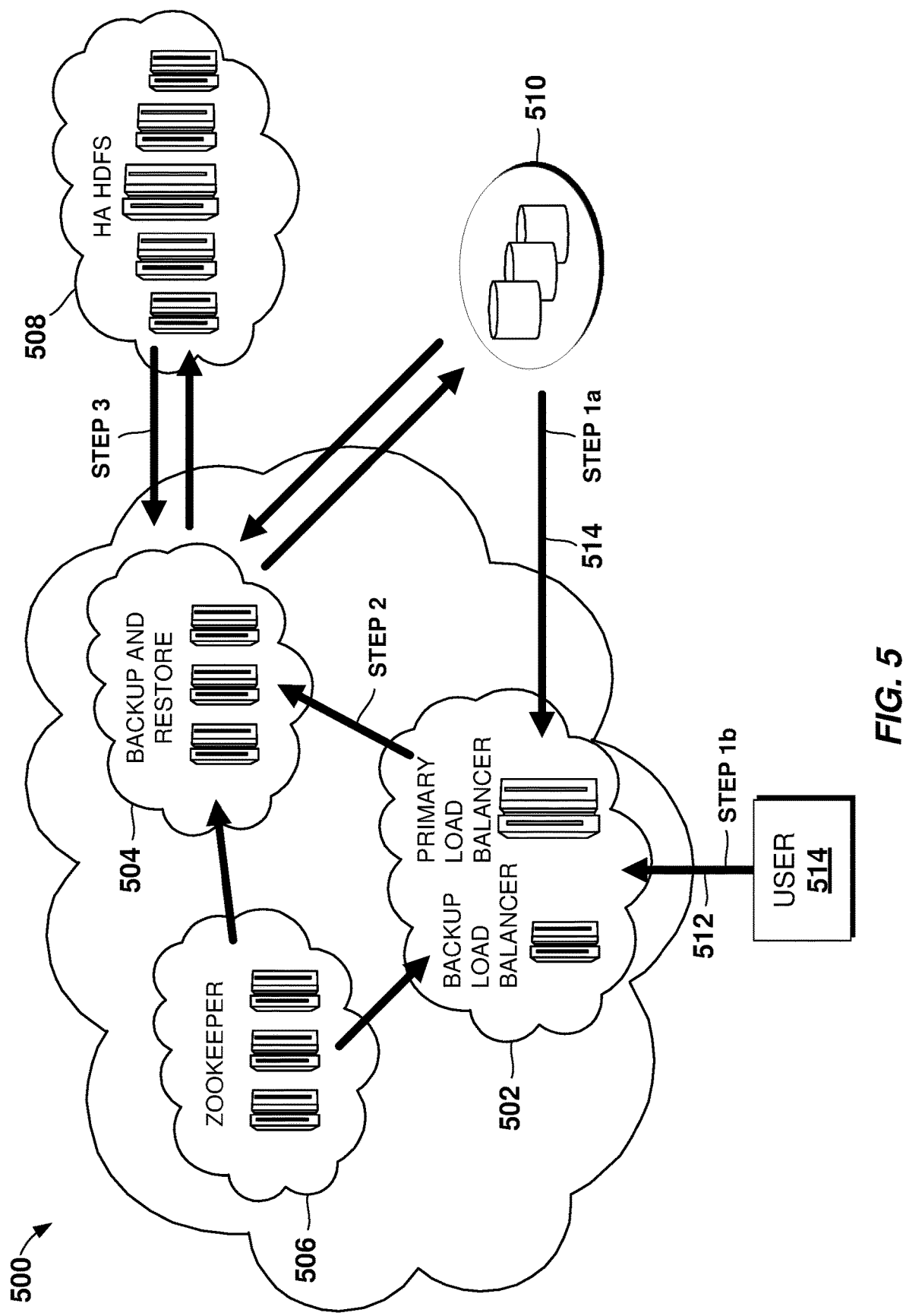
FIG. 5 is a schematic block diagram of an exemplary system, according to some embodiments of the present invention.

Reference is now made to FIG. 5, showing a schematic block diagram of an exemplary system 500, according to some embodiments of the present invention. In an embodiment, the proposed disaster recovery approach includes four modules (tiers): (1) a load-balancer module 502; (2) a backup and restore management module 504; (3) a monitoring module 506, implemented using ZooKeeper; and (4) a stable storage module 508, implemented using Hadoop File System (HDFS). The present embodiment of the proposed disaster recovery approach can be applied to any document-based NoSQL database. In one implementation, the document-based NoSQL database includes the IBM Cloudant database, which is a variant of the CouchDB database with some additional functionalities. Cloudant is offered both as a Cloud service and as a software only distribution for use in an on-premise setting.

The present embodiment provides two backup modes of operation: i) on-demand; and ii) continuous (the default mode). The trigger for both of these modes is a REST request (512, 514) sent to the load-balancer module 502. With the on-demand mode, the REST request (512, step 1b) is generated by a user 516 invoking REST APIs, for example, using a client web interface. The body of the request contains a JSON document describing the desired operation. With the continuous mode, the trigger for generating the REST request (514, step 1a) is a change applied to the database, which results in a notification sent by the NoSQL database's 510 changes feed.

The load-balancer module 502 is composed of a primary load-balancer and one or more secondary, or backup, load-balancers. Upon bootstrap and upon a failure of the primary load-balancer a new primary load-balancer is chosen out of a set of available load-balancers using a ZooKeeper leader election recipe. At each point in time, there is (at most) a single primary load-balancer server that handles all the requests. The primary load-balancer is a tiny server that forwards the aforementioned backup/restore REST requests (512,514) to a random (stateless) worker from the backup and the restore management module 504 (step 2). This worker executes the operation described in the JSON document attached to the request received from the load-balancer module 502.

Upon completion of the execution of the request, the worker sends a positive acknowledgment to the load-balancer module 502, specifically the primary load-balancer. Upon a worker failure (detected either by timeout expiration at the primary load-balancer or by an event generated by ZooKeeper monitoring services) the primary load-balancer forwards the request to another worker. The backup/restore worker serves the request by writing/reading data to/from HDFS (step 3).

Below, the aforementioned modules are described in more detail. First, for the clarity of the presentation, a simplified version of the disaster recovery approach in which only the last copy of each database document is being replicated to HDFS. Then, the simplified version is expanded upon to support an arbitrary number of recent ("older") copies of each document.

Load-Balancer Module (LBM)

In an embodiment, the primary load-balancer runs the below code (Table 1) for every received backup/restore request received from the Cloudant database. In the code, BRM stands for Backup and Restore Module which is described in detail below. The below mentioned global queue of each backup/restore worker is implemented using a ZooKeeper recipe also described in detail below.

TABLE 1

Load Balance Module Algorithm

| | |
|---|---|
| 1 | req(jsonBody) |
| 2 | Wake up dead BRM workers. |
| 3 | Let r be the BRM worker that assigned |
| 4 | to work on current request. |
| 5 | set the request to r's global queue and |
| 6 | post the request to r. |
| 7 | on success, if jsonBody.isContinues |
| 8 | then |
| 9 |     register to follow changes. |
| 10 |     store the received data in the |
| 11 | meta-data global storage. |
| 12 | on error |
| 13 |     if there is one (or more) alive |
| 14 |     worker: |
| 15 |         set r as dead with the |
| 16 |         current timestamp. |
| 17 |         re-hash the inputs for the |
| 18 |         alive workers. |
| 19 |     Otherwise |
| 20 |         go to sleep for a constant |
| 21 |         time and wake up dead BRM |
| 22 |         workers. |
| 23 |     Empty r's global queue. |
| 24 |     Run again on all the |
| 25 |     unfinished requests. |

Line 1 gets the request with a JSON body including the request parameters. For a change request, the request includes the new/changed JSON document. Step 2 wakes up the backup and restore module workers that were unavailable on previous requests. When a worker is unavailable, it is considered dead for a predefined fixed time. All change requests for a given document are assigned to a given worker using a consistent hash function applied on the document ID. This way, subsequent changes to this document will be handled by the same worker. Step 6 assigned to such a worker. The change request is marked as "ongoing" by putting it in a global queue. On success, the worker will remove the request from this queue. Step 12 is invoked on failure when the worker is unavailable. In step 16, if one of the workers that is assigned to work on some request is dead, then we re-hash requests assigned to this worker so they are re-mapped to alive workers. In this case, the load-balancer module 502 assumes that the current request as well as all ongoing requests in r's global queue were not served. Therefore, all the ongoing requests from r's global queue are being served again from step 1. The number of backup and restore module workers can be adjusted on the fly to accommodate changing loads.

Backup and Restore Module (BRM)

The backup and restore module 504 is an elastic module composed out of stateless workers that are executing backup/restore/change requests received from the load-balancer module 502. Using consistent hashing applied by the primary load-balancer, changes to a given document are handled by a given backup/restore worker (if there are no failures). If a worker is considered dead for a predefined threshold, then another worker is arbitrarily chosen by the load-balancer module 502, according to the load balancer module algorithm described above. When the backup and restore module worker gets a request it immediately responds with positive status and serves the request. When the backup and restore module worker finishes to serve the request it removes the request from its queue (implemented on top of ZooKeeper). If during this process the backup and restore module worker goes down, then the request will remain on the queue and will be discovered as unfinished at step 25 of the load balancer module algorithm. For every backup, restore or (document) change request (invoked upon a new/changed document event when in continuous backup mode) the following code is invoked:

TABLE 2

Backup Algorithm

| | |
|---|---|
| 1 | backupReq(jsonBody) |
| 2 | get meta-data of all document |
| 3 | ids from database |
| 4 | jsonBody.Cloudantdbname. |
| 5 | if meta-data 'ok' |
| 6 | respond with 'ok' status |
| 7 | otherwise respond with |
| 8 | 'error' status |
| 9 | generate parallel https requests |
| 10 | to get the documents of all ids. |
| 11 | In parallel for every document |
| 12 | received from Clodant |
| 13 | create new file in HDFS |
| 14 | write the document body |
| 15 | to the file. |
| 16 | report success |
| 17 | if the write of all documents |
| 18 | succeed then remove the request |
| 19 | from the queue. |

TABLE 3

Restore Algorithm

| | |
|---|---|
| 1 | restoreReq(jsonBody) |
| 2 | respond with 'ok' status. |
| 3 | Destroy jsonBody.Cloudantdbname |
| 4 | Create new Cloudant database |
| 5 | with jsonBody.Cloudantdbname |
| 6 | In parallel read all files |
| 7 | from HDFS that included in |

TABLE 3-continued

Restore Algorithm

| | |
|---|---|
| 8 | the jsonBody.Cloudantdbname |
| 9 | database |
| 10 | Write each file data as a |
| 11 | new document to the new |
| 12 | database. |
| 13 | report success. |
| 14 | if all the writes succeed |
| 15 | remove the request from the |
| 16 | queue. |

TABLE 4

Change Algorithm

| |
|---|
| 1 changeReq(jsonBody) |
| 2 respond with 'ok' status |
| 3 If the document marked as |
| 4 deleted: |
| 5 Delete the document file |
| 6 from the HDFS. |
| 7 Otherwise |
| 8 Delete the file |
| 9 from HDFS. |
| 10 Create new file |
| 11 for the new data. |
| 12 Write the new |
| 13 data to the new file. |
| 14 Remove the request from the |
| 15 queue. |

The architecture of the present embodiment is based on a storage tier that needs to support the following two requirements: (1) a hashmap-like interface with low access latency (for example, an amortized constant access latency); and (2) high scalability, such as, for example, supporting millions and tens of millions of files. In the present approach, we are using HDFS as a possible implementation for such a tier. HDFS does support a hashmap-like interface as well as it is relatively scalable. In a scenario in which there are many small files, techniques such as Hadoop Archives (HAR files) can be used in order to aggregate small data files into a substantially smaller number of HDFS files.

In a high throughput scenario in which the input rate (the rate in which documents are inserted to or changed in the database) is higher than the backup rate, then the backup process will finally fail. It should be noted however that the backup rate can be increased by adding on-demand additional HDFS data nodes. It should also be noted that several backup aggregation techniques can be applied in order to further increase the backup throughput. For example, since (in the absence of failures) all the versions of a given document are handled by the same backup/restore worker (due to the usage of consistent hashing) and are stored in the same worker queue, then before a backup operation of a document in HDFS a worker can scan its queue to see if there are additional (newer) versions of this document. In such a case, the worker can drop the existing document, backing-up only the latest version of this document.

ZooKeeper Module

Figure 6:
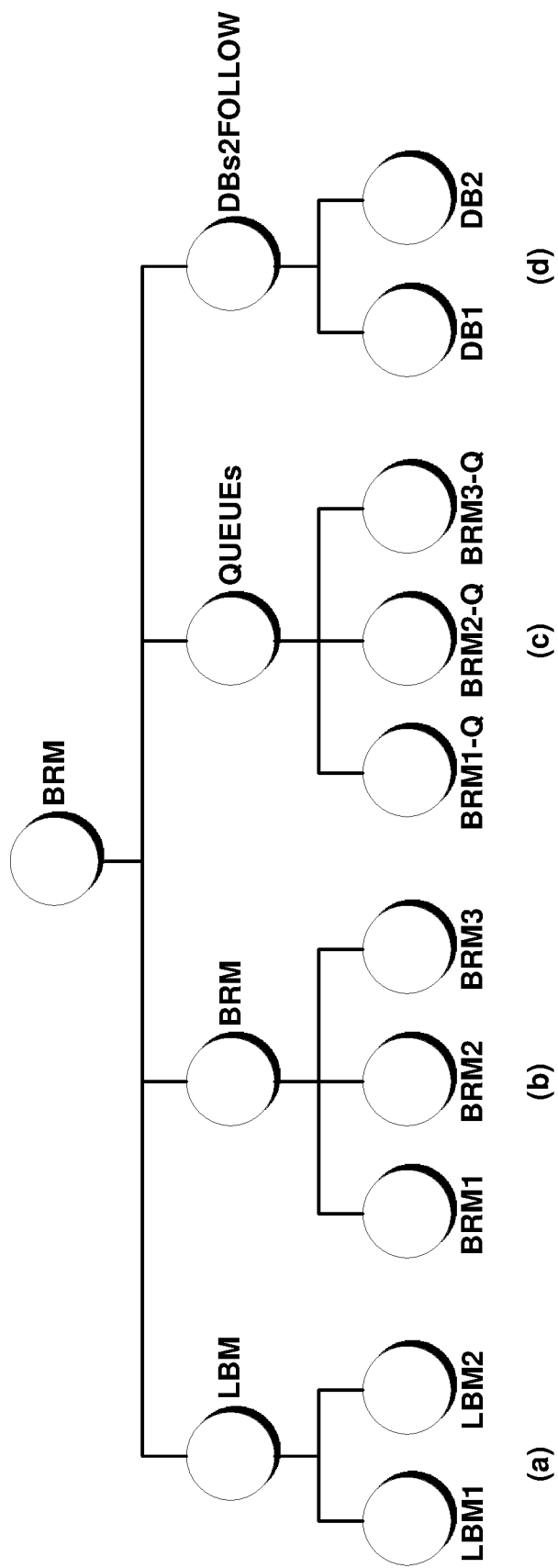
FIG. 6 is an overview of ZooKeeper file hierarchy for an exemplary system, according to some embodiments of the present invention.

Reference is now made to FIG. 6, showing an overview of ZooKeeper file hierarchy for a system with three backup/restore workers and two load balancers, according to some embodiments of the present invention. The ZooKeeper file hierarchy of FIG. 6 includes: (a) choosing the primary load-balancer using the leader election recipe; (b) liveness monitoring of backup/restore workers; and (c)/(d) metadata storage.

FIG. 6 illustrates the higher level services provided by ZooKeeper according to the present embodiment. These services include: (1) Group membership; (2) Metadata storage; and (3) Leader election. The group membership service is used by the load-balancer module 502 and backup/restore module 504 (see FIG. 5) for liveness monitoring. The leader election is used by the load-balancer module 502 for choosing the primary load-balancer. The metadata storage is used for: Queue management, Load-balancer module configuration, and Leader Election.

Queue management: each backup/restore worker has its own queue holding all the unfinished requests served by this worker. In FIG. 6(c) there are three queues for three workers.

Load-balancer module configuration: this configuration holds all the (backup) follow requests received by the load balancer module for continuous backup (step 9 of the load-balance module algorithm). In a case of changing a primary load-balancer, the new primary load-balancer needs to follow all changes in this configuration.

Leader Election: is used by the load-balancer module for the leader election algorithm.

Backup Versioning

Figure 7:
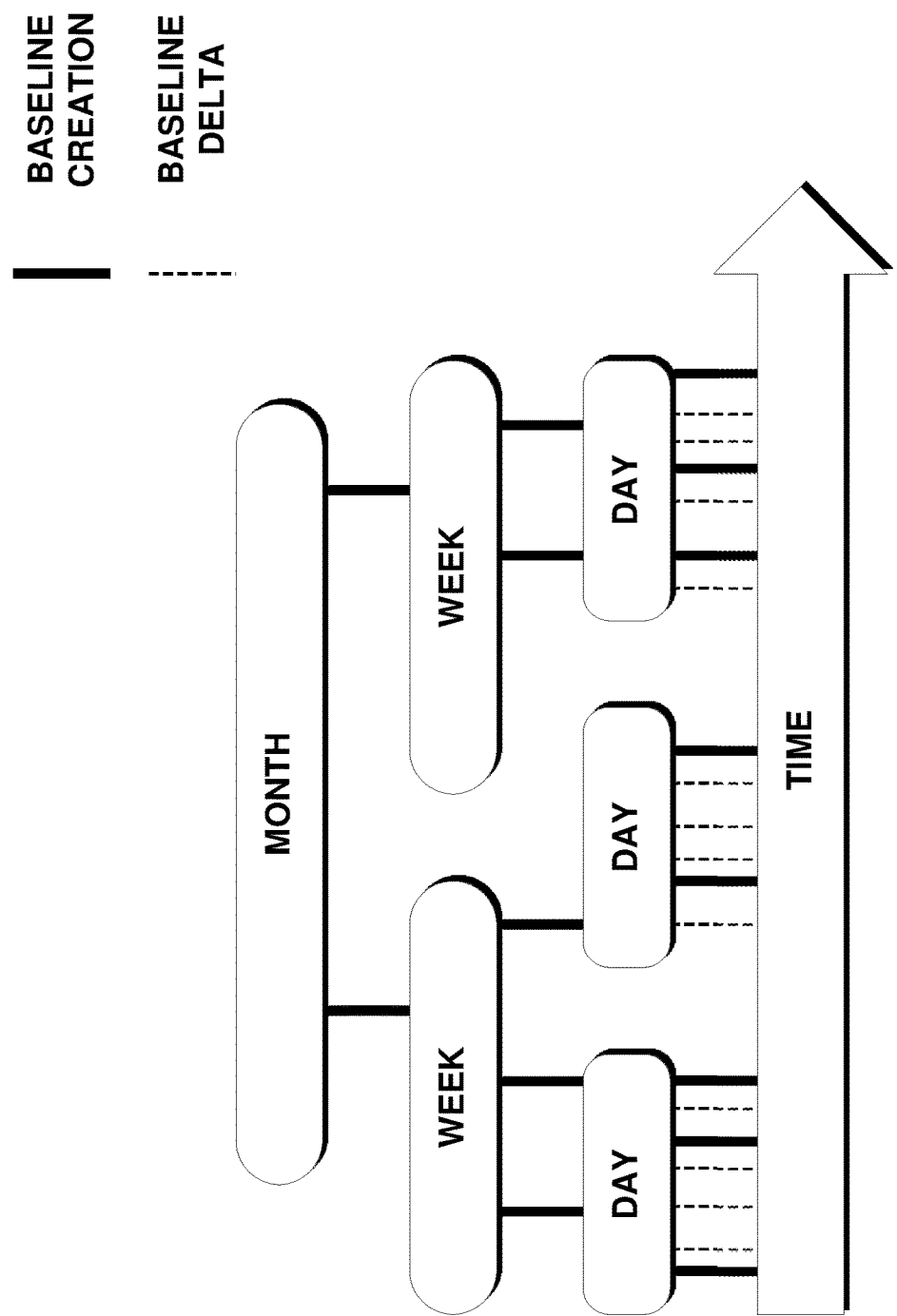
FIG. 7 is an overview of document-level versioning using an exemplary system, according to some embodiments of the present invention.

Reference is now made to FIG. 7, shows an example of how the disaster recovery approach described in detail above can support document-level versioning with daily, weekly and monthly 'baseline' deltas 1. As previously described, the disaster recovery approach leveraged the version number attached to each database document. This number reflects the state of the document at a given time. The first backup request takes a full backup of the entire database. The versions and the states of the documents are maintained by the database. In Cloudant this is implemented using the _rev field indicating a document's revision number. The first backup is considered as the 'baseline' for the other changes. In the continuous backup mode, the primary load-balancer is notified upon every database change. Such a notification contains the new/changed document with a new (increasing) version number. From this point on, the system stores and backups only a document that has been changed since the last 'baseline'. These changes from the last 'baseline' are considered 'baseline delta'. The system configuration specifies how many 'baseline delta' to keep before creating a new 'baseline'. Daily 'baselines' become weekly 'baselines' and weekly 'baselines' become monthly 'baselines'.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 8:
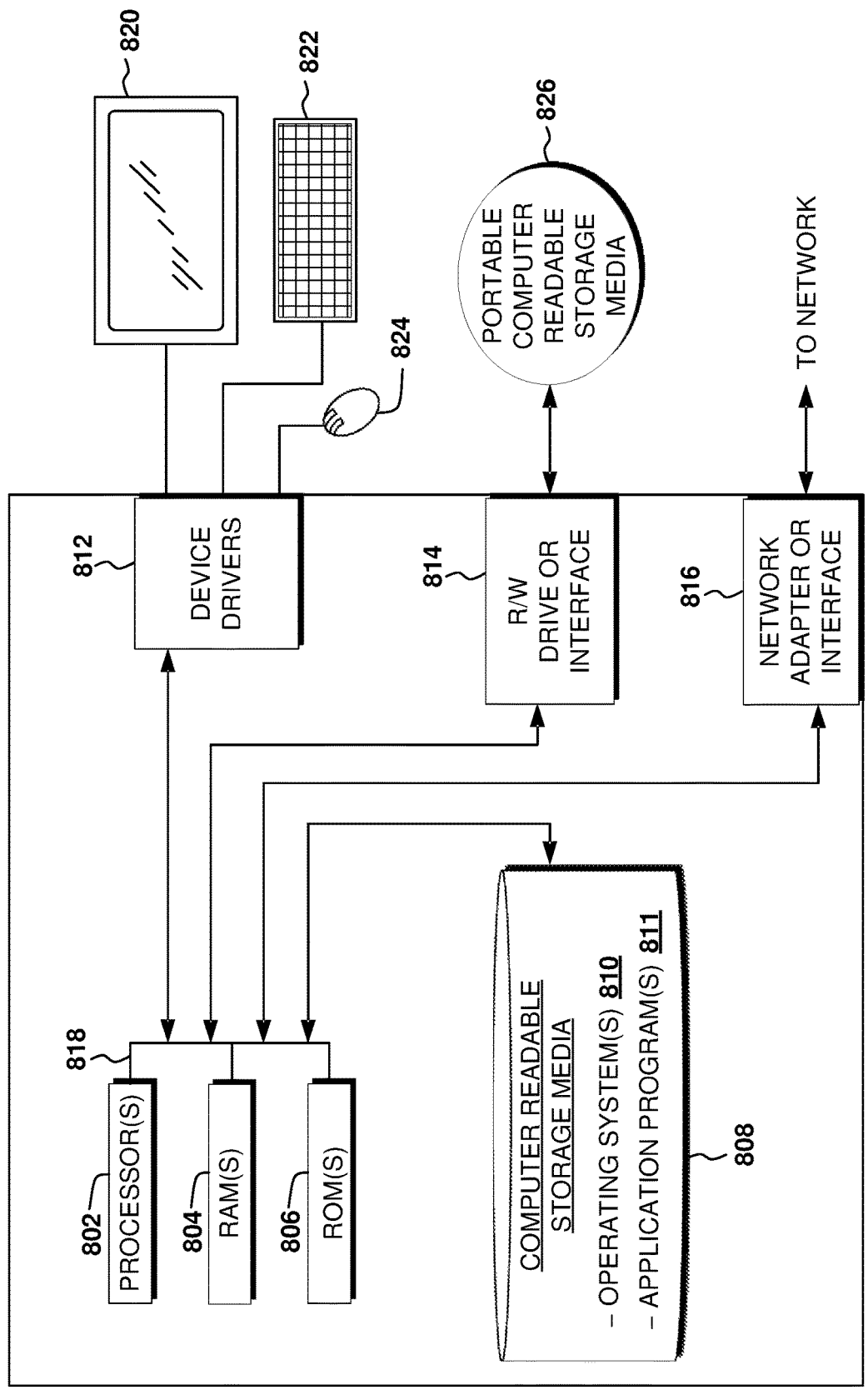
FIG. 8 is a block diagram of an exemplary computing device, according to some embodiments of the present invention.

Referring now to FIG. 8, a block diagram of components of a computing device, such as the one or more backup coordinators 102, the one or more local document managers 104, the backup agent 110, and the monitor hardware processor 114 of the system 100 of FIG. 1, in accordance with an embodiment of the present invention is shown. It should be appreciated that FIG. 8 provides only an illustration of one implementation and does not imply any limitations with regard to the environments in which different embodiments may be implemented. Many modifications to the depicted environment may be made.

The computing device may include one or more processors 802, one or more computer-readable RAMs 804, one or more computer-readable ROMs 806, one or more computer readable storage media 808, device drivers 812, read/write drive or interface 814, network adapter or interface 816, all interconnected over a communications fabric 818. Communications fabric 818 may be implemented with any architecture designed for passing data and/or control information between processors (such as microprocessors, communications and network processors, etc.), system memory, peripheral devices, and any other hardware components within a system.

One or more operating systems 810, and one or more application programs 811, for example the backup application, are stored on one or more of the computer readable storage media 808 for execution by one or more of the processors 802 via one or more of the respective RAMs 804 (which typically include cache memory). In the illustrated embodiment, each of the computer readable storage media 808 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

The computing device may also include a R/W drive or interface 814 to read from and write to one or more portable computer readable storage media 826. Application programs 811 on the computing device may be stored on one or more of the portable computer readable storage media 826, read via the respective R/W drive or interface 814 and loaded into the respective computer readable storage media 808.

The computing device may also include a network adapter or interface 816, such as a TCP/IP adapter card or wireless communication adapter (such as a 4G wireless communication adapter using OFDMA technology). Application programs 811 on the computing device may be downloaded to the computing device from an external computer or external storage device via a network (for example, the Internet, a local area network or other wide area network or wireless network) and network adapter or interface 816. From the network adapter or interface 816, the programs may be loaded onto computer readable storage media 808. The network may include copper wires, optical fibers, wireless transmission, routers, firewalls, switches, gateway computers and/or edge servers.

The computing device may also include a display screen 820, a keyboard or keypad 822, and a computer mouse or touchpad 824. Device drivers 812 interface to display screen 820 for imaging, to keyboard or keypad 822, to computer mouse or touchpad 824, and/or to display screen 820 for pressure sensing of alphanumeric character entry and user selections. The device drivers 812, R/W drive or interface 814 and network adapter or interface 816 may include hardware and software (stored on computer readable storage media 808 and/or ROM 806).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is expected that during the life of a patent maturing from this application many relevant NoSQL databases and stable storages will be developed and the scope of the terms "NoSQL database" and "stable storage" is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A document management system comprising:
   at least one local document manager, comprising at least one hardware processor connected to a local document storage; and
   at least one backup coordinator comprising at least one other hardware processor connected to the at least one local document manager and configured to:
      continuously receive a plurality of change notifications from the at least one local document manager, each of the plurality of change notifications comprising change information describing a change in a document stored in the at least one local document manager's local document storage; and
      for each notification in the plurality of change notifications:
         select a backup agent from a plurality of backup agents connected to the at least one backup coordinator, wherein the backup agent comprises at least one third hardware processor;
         send a backup request to the selected backup agent comprising the change information, for updating a copy of the document stored in a backup storage connected to the backup agent;
         wait for an acknowledgement message from the selected backup agent; and
         send another backup request to another backup agent selected from the plurality of backup agents upon a failure to receive the acknowledgement message within an identified amount of time after sending the backup request.

2. The document management system of claim 1, wherein the at least one backup coordinator is further adapted to:
   receive from at least one of the at least one local document manager a first request to restore the document;
   send a second request to at least one of the plurality of backup agents to restore the document;
   receive from at least one of the plurality of backup agents a message comprising the document; and
   send the document to the at least one of the at least one local document manager.

3. The document management system of claim 1, wherein the at least one backup coordinator is further adapted to:
   receive, from a local document manager of the at least one local document manager or from a user via a management interface, a document backup request comprising information identifying one or more local documents stored in the at least one local document manager's local document storage;
   retrieve the one or more local documents from the at least one local document manager's local document storage; and
   for each local document of the one or more local documents:
      select an on-demand backup agent from the plurality of backup agents;
      send the on-demand backup agent an on-demand backup request comprising the local document, for updating a copy of the local document stored in the backup storage connected to the on-demand backup agent;
      wait for an on-demand acknowledgement message from the on-demand backup agent; and send another on-demand backup request to another on-demand backup agent selected from the plurality of backup agents upon a failure to receive the on-demand acknowledgement message within the identified amount of time after sending the on-demand backup request.

4. The document management system of claim 1, wherein the at least one backup coordinator is connected to the at least one local document manager via a first digital communication network.

5. The document management system of claim 1, wherein the at least one backup coordinator is connected to the plurality of backup agents via a second digital communication network.

6. The document management system of claim 1, wherein the at least one backup coordinator is further adapted to execute at least one Representational State Transfer (REST) interface; and
  wherein the at least one backup coordinator receives a plurality of change request messages via the at least one REST interface.

7. The document management system of claim 1, wherein the at least one backup coordinator is further adapted to:
  receive from the backup agent a failure message indicating a failure to update the copy of the document stored in the backup storage connected to the backup agent; and
  send another backup request to another backup agent upon receiving the failure message.

8. The document management system of claim 1, wherein the change information comprises a document version number.

9. The document management system of claim 2, wherein the first request and the second request comprise a document version number.

10. The document management system of claim 1, further comprising at least one monitor hardware processor connected to the at least one backup coordinator and at least one backup agent, and adapted to:
  detect a failure of the backup agent to update the copy of the document stored in the backup storage connected to the backup agent; and
  send a monitoring message to the backup coordinator indicating the failure; and
  wherein the at least one backup coordinator is further adapted to:
    receive the monitoring message; and
    send another backup request to another backup agent, upon receiving the monitoring message.

11. The document management system of claim 1, wherein the at least one backup coordinator maps each of the at least one local document manager to one of the at least one backup agent; and
  wherein the backup coordinator selects the backup agent according to the mapping.

12. The document management system of claim 1, wherein the at least one backup coordinator comprises a primary backup coordinator.

13. The document management system of claim 1, wherein the backup storage connected to the backup agent is a Hadoop File System (HDFS).

14. The document management system of claim 10, wherein the at least one monitoring hardware processor executes Apache ZooKeeper.

15. The document management system of claim 1, wherein the local document storage is a document-based Not Only Structured Query Language (NoSQL) database.

16. The document management system of claim 15, wherein the local document storage is an International Business Machines (IBM) Cloudant database.

17. A method for managing documents, comprising:
  continuously receiving a plurality of change notifications from at least one local document manager, each of the plurality of change notifications comprising change information describing a change in a document stored in the at least one local document manager's local document storage; and
  for each notification in the plurality of change notifications:
    selecting a backup agent from a plurality of backup agents;
    sending a backup request comprising the change information to the selected backup agent, wherein a copy of the document stored in a backup storage is updated based on the backup request;
    receiving an acknowledgement message from the selected backup agent confirming a successful completion of the backup request; and
    sending another backup request to another backup agent selected from the plurality of backup agents upon a failure to receive the acknowledgement message within an identified amount of time after sending the backup request.

18. The method of claim 17, further comprising:
  in response to determining the acknowledgement message was not received from the selected backup agent within a predetermined amount of time after sending the backup request:
    selecting another backup agent from the plurality of backup agents; and
    sending another backup request to the ether selected another backup agent.

19. The method of claim 17, wherein the change information comprises an instruction to create the document, an instruction to delete the document, or an instruction to modify contents of the document.

* * * * *